US012427778B2

(12) United States Patent
Maruyama et al.

(10) Patent No.: US 12,427,778 B2
(45) Date of Patent: Sep. 30, 2025

(54) RECORDING APPARATUS

(71) Applicant: CANON KABUSHIKI KAISHA, Tokyo (JP)

(72) Inventors: Taiji Maruyama, Kanagawa (JP); Koya Iwakura, Kanagawa (JP); Hideaki Matsumura, Kanagawa (JP); Tetsu Hamano, Tokyo (JP); Nobuhiro Toki, Kanagawa (JP); Daiju Takeda, Kanagawa (JP); Fumie Kameyama, Tokyo (JP); Koki Shimada, Kanagawa (JP); Shota Asada, Tokyo (JP); Ken Takenaga, Kanagawa (JP); Yusuke Tanaka, Kanagawa (JP); Yuta Araki, Chiba (JP); Atsushi Matsuyama, Kanagawa (JP); Yusuke Naratani, Tokyo (JP); Kousuke Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/507,946

(22) Filed: Nov. 13, 2023

(65) Prior Publication Data

US 2024/0109332 A1 Apr. 4, 2024

Related U.S. Application Data

(63) Continuation of application No. 18/189,905, filed on Mar. 24, 2023, now Pat. No. 11,833,835, which is a (Continued)

(30) Foreign Application Priority Data

Jul. 29, 2020 (JP) ................................ 2020-128077

(51) Int. Cl.
*B41J 2/175* (2006.01)
*B41J 29/13* (2006.01)

(52) U.S. Cl.
CPC ......... *B41J 2/1754* (2013.01); *B41J 2/17509* (2013.01); *B41J 2/17523* (2013.01); *B41J 2/17553* (2013.01); *B41J 29/13* (2013.01)

(58) Field of Classification Search
CPC B41J 2/17523; B41J 2/17513; B41J 2/17596; B41J 2/175; B41J 2/17509; B41J 2/1752

(Continued)

(56) References Cited

U.S. PATENT DOCUMENTS

2011/0267399 A1* 11/2011 Ikeda .................. B41J 2/17509 347/29
2017/0151796 A1* 6/2017 Kamiya .................. B41J 29/13

(Continued)

FOREIGN PATENT DOCUMENTS

CN 205149218 U 4/2016
CN 106553456 A 4/2017

(Continued)

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A recording apparatus includes a conveyance unit that conveys a recording medium in a first direction toward a recording head for ejecting a liquid, a tank including a containing chamber containing the liquid to be supplied to the recording head, and an injection port through which the liquid is injected into the containing chamber, the tank being disposed downstream of the conveyance unit in the first direction, a rotatable lever that holds a tank cap for closing the injection port, and a cover that rotates about a rotation shaft between an open position for exposing the lever and a closed position for covering the lever, the rotation shaft being disposed upstream of the conveyance unit in the first direction. The cover includes a sliding portion that is provided on a surface facing the lever and comes into contact (Continued)

with the lever while the cover is rotating toward the closed position.

16 Claims, 12 Drawing Sheets

Related U.S. Application Data continuation of application No. 17/383,246, filed on Jul. 22, 2021, now Pat. No. 11,633,954.

(58) Field of Classification Search
USPC ........ 347/86
See application file for complete search history.

(56) References Cited

U.S. PATENT DOCUMENTS

| | | | | |
|---|---|---|---|---|
| 2017/0355197 | A1* | 12/2017 | Kudo | B41J 2/17523 |
| 2018/0311964 | A1 | 11/2018 | Tanaka | |
| 2020/0316957 | A1* | 10/2020 | Araki | B41J 2/1754 |

FOREIGN PATENT DOCUMENTS

| | | | |
|---|---|---|---|
| CN | 107487082 | A | 12/2017 |
| CN | 108016138 | A | 5/2018 |
| CN | 114055947 | B | 7/2023 |
| JP | 2017065085 | A | 4/2017 |
| JP | 2017081173 | A | 5/2017 |

* cited by examiner

RECORDING APPARATUS

CROSS-REFERENCE TO RELATED APPLICATIONS

This application is a continuation of U.S. application Ser. No. 18/189,905, filed Mar. 24, 2023, which is a continuation of U.S. application Ser. No. 17/383,246, filed Jul. 22, 2021, now U.S. Pat. No. 11,633,954, issued Apr. 25, 2023, which claims the benefit of Japanese Patent Application No. 2020-128077, filed Jul. 29, 2020, each of which is hereby incorporated by reference herein in their entirety.

BACKGROUND OF THE INVENTION

Field of the Invention

The present disclosure relates to a recording apparatus that records an image.

Description of the Related Art

Conventionally, there is known an ink jet recording apparatus including an ink tank that is capable of containing ink to be supplied to a recording head for ejecting the ink. The ink tank is provided with an injection port through which a user can inject the ink into the ink tank. By removing a tank cap, which closes the injection port, from the injection port, the user can inject the ink into the ink tank.

Japanese Patent Application Laid-Open No. 2018-69705 discusses a printer that includes a tank cover allowing the opening and closing of an injection port, and an outer cover pivotally supported on a housing and allowing the uncovering of a conveyance path of a recording medium. If a user performs an operation of closing the outer cover without closing the tank cover, the outer cover interferes with the tank cover and cannot be closed. This prevents the user from closing the outer cover with the tank cover open. Japanese Patent Application Laid-Open No. 2018-69705 also discusses a configuration in which, if the user performs an operation of closing the tank cover without closing the cap, the cap can be moved to a position where the cap can be closed, in conjunction with the operation of closing the tank cover.

With the configuration discussed in Japanese Patent Application Laid-Open No. 2018-69705, however, at the completion of ink injection, the user needs to close the cap, the tank cover, and the outer cover, which may be troublesome for the user.

SUMMARY OF THE INVENTION

The present disclosure is directed to providing a recording apparatus that has a simple configuration capable of preventing an injection port from being forgotten to be closed.

According to an aspect of the present disclosure, a recording apparatus includes a conveyance unit configured to convey a recording medium in a first direction toward a recording head for ejecting a liquid, a tank including a containing chamber containing the liquid to be supplied to the recording head, and an injection port through which the liquid is injected into the containing chamber, the tank being disposed downstream of the conveyance unit in the first direction, a lever configured to rotate and hold a tank cap for closing the injection port, and a cover configured to rotate about a rotation shaft between an open position for exposing the lever and a closed position for covering the lever, the rotation shaft being disposed upstream of the conveyance unit in the first direction. The cover includes a sliding portion provided on a surface facing the lever and configured to come into contact with the lever while the cover is rotating toward the closed position.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings. The exemplary embodiments described below do not limit the scope of the present disclosure, and not all combinations of features described in the exemplary embodiments are necessarily essential to the solutions of the present disclosure. Relative arrangements, shapes, and the like of components described in the exemplary embodiments are mere examples and are not intended to limit the scope of the present disclosure thereto.

<Apparatus Configuration>

Figure 1:
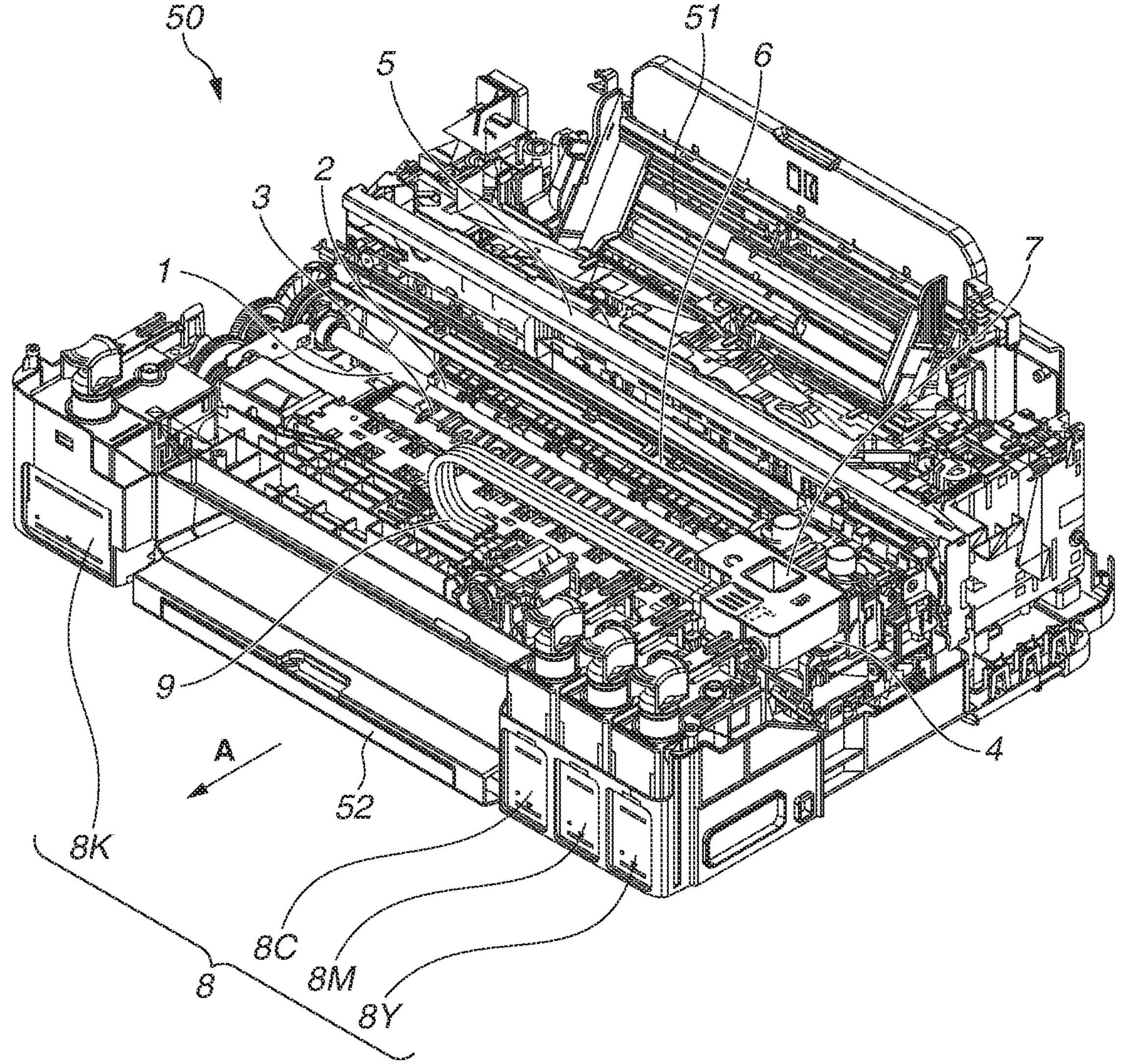
FIG. 1 is a perspective view illustrating an internal configuration of an ink jet recording apparatus according to a first exemplary embodiment.

FIG. 1 is a perspective view illustrating an internal structure of an ink jet recording apparatus (hereinafter referred to as a recording apparatus) 50 according to a first exemplary embodiment. The recording apparatus 50 includes a recording head 4 that ejects ink (liquid) to a recording medium to record an image on the recording medium. The recording apparatus 50 also includes a scanner unit 21 (see FIGS. 5A to 5C) as a cover that is openable and closable with respect to a housing of the recording apparatus 50. FIG. 1 illustrates a state where the scanner unit 21 is removed from the recording apparatus 50.

The recording apparatus 50 separates one sheet from the recording medium stacked in a paper feed tray 51 on the back side or in a paper feed cassette 52 on the front side, and feeds the sheet using a feed roller (not illustrated) serving as a feed unit. The recording medium fed by the feed roller is pinched between a conveyance roller 1 serving as a conveyance unit and a pinch roller 2 driven by the conveyance roller 1, and is conveyed in a direction (direction A) indicated by an arrow A, toward a recording position facing the recording head 4. The conveyance roller 1 is made of metal and has fine asperities on the surface so as to generate a large friction force. The pinch roller 2 is elastically pressed against the conveyance roller 1 by a pressing member such as a spring (not illustrated).

The recording apparatus 50 further includes a platen 3 at a position facing the recording head 4. The recording medium conveyed to the recording position is supported at the back surface thereof by the platen 3. The platen 3 maintains the distance between an ejection port surface of the recording head 4 on which ejection ports for ejecting the ink are provided and a surface of the recording medium facing the ejection port surface, at a predetermined (constant) value. The recording medium is subjected to recording based on data by the recording head 4 at the recording position. Upon completion of the recording by the recording head 4, the recording medium is pinched between a discharge roller (not illustrated) and a spur that is a rotator driven by the discharge roller, and is discharged to the outside of the recording apparatus 50. The discharge roller is a rubber roller with a high coefficient of friction. The spur is elastically pressed against the discharge roller by a pressing member such as a spring (not illustrated).

In the present exemplary embodiment, the direction (the direction A illustrated in FIG. 1) in which the recording medium is conveyed by the conveyance unit is referred to as the conveyance direction. Thus, the upstream side of the conveyance direction corresponds to the back side of the recording apparatus 50, and the downstream side of the conveyance direction corresponds to the front side of the recording apparatus 50.

The recording head 4 is mounted on a carriage 7 that reciprocates in a main scanning direction crossing the conveyance direction. The carriage 7 is caused to reciprocate by a driving unit, such as a motor, while being guided by two guide rails, an upper guide rail 5 and a lower guide rail 6, which extend in the main scanning direction. In the present exemplary embodiment, the conveyance direction and the main scanning direction are orthogonal to each other.

The recording head 4 ejects ink droplets while moving together with the carriage 7 in the main scanning direction, thereby recording an image with a predetermined length (corresponding to one band) on the recording medium (which is referred to as a recording operation). When the image corresponding to one band has been recorded, the recording medium is conveyed by a predetermined amount by the conveyance roller 1 and the pinch roller 2 (which is referred to as an intermittent conveyance operation). Repeating the one-band image recording operation and the intermittent conveyance operation allows the entire image to be recorded on the recording medium based on the image data.

The recording head 4 according to the present exemplary embodiment includes an element (e.g., a heating resistance element) for generating thermal energy as energy for use in ink ejection, and uses a method of causing the state change of the ink (film boiling) using the generated thermal energy. This achieves high-density and high-definition image recording. The ink ejection method according to the present exemplary embodiment is not limited to the method using the thermal energy, and may be a method using a piezoelectric transducer and vibration energy.

In the present exemplary embodiment, the recording head 4 is described as a serial head mounted on the reciprocating carriage 7. The recording head 4 according to the present disclosure is not limited thereto, and may be a line head having a plurality of ejection ports arranged in an area corresponding to a recording medium width.

Ink tanks 8 are provided in the recording apparatus 50 for respective colors of the ink ejectable by the recording head 4. In the present exemplary embodiment, the ink tanks 8 are fixed to the front side of the recording apparatus 50. The recording apparatus 50 according to the present exemplary embodiment includes a black ink tank 8K containing black ink, a cyan ink tank 8C containing cyan ink, a magenta ink tank 8M containing magenta ink, and a yellow ink tank 8Y containing yellow ink. These four ink tanks 8K, 8C, 8M, and 8Y are collectively referred to as the ink tanks 8. The cyan ink, the magenta ink, and the yellow ink are examples of the color ink, and the color ink according to the present exemplary embodiment is not limited thereto.

As illustrated in FIG. 1, the black ink tank 8K is arranged on the left side of the paper feed cassette 52 as viewed from the front side of the recording apparatus 50. On the other hand, the cyan ink tank 8C, the magenta ink tank 8M, and the yellow ink tank 8Y are arranged on the right side of the paper feed cassette 52 as viewed from the front side of the recording apparatus 50. In other words, the paper feed cassette 52 is disposed between the black ink tank 8K and the color ink tanks 8C, 8M, and 8Y. The ink tanks 8 are connected to the recording head 4 via respective flexible supply tubes 9 that form supply flow paths for supplying the ink to the recording head 4. Accordingly, the ink contained in each of the ink tanks 8 can be independently supplied to an ejection port array of the recording head 4 corresponding to each of the ink colors.

Figure 2:
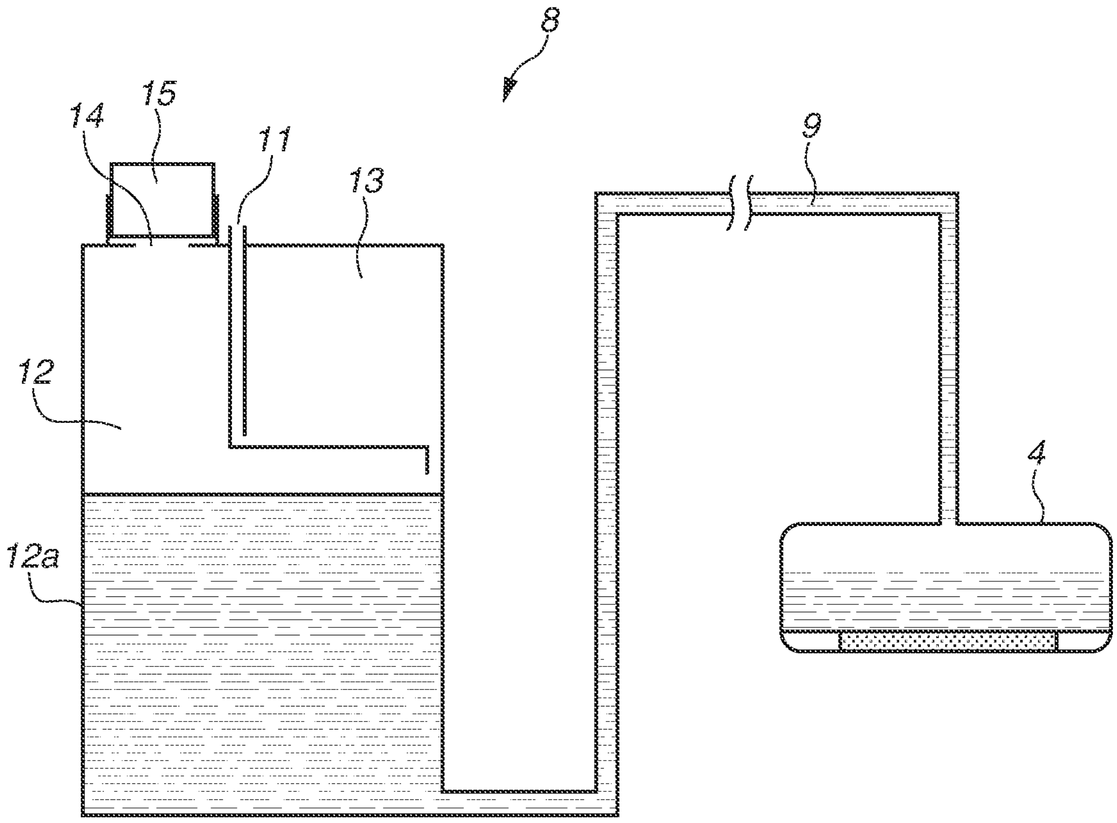
FIG. 2 is a schematic cross-sectional view illustrating an outline of each of ink tanks according to the first exemplary embodiment.

FIG. 2 is a schematic cross-sectional view illustrating an outline of each of the ink tanks 8. Each of the ink tanks 8 includes an ink containing chamber 12, an air communication path 11 having an air communication port and configured to communicate with the air, and a buffer chamber 13 provided above the ink containing chamber 12. Every time a certain amount of ink is ejected from the recording head 4 during the recording operation, the same amount of ink is subsequently supplied from the ink containing chamber 12 via the supply tubes 9. The same amount of air (atmosphere) as the amount of ink consumed from the ink containing chamber 12 is introduced from the air communication path 11 into the ink containing chamber 12 via the buffer chamber 13. Each of the ink tanks 8 has a transparent visual observation surface 12*a* that allows the user to check the amount of ink in the ink containing chamber 12 through a window portion formed on the front side of the recording apparatus 50.

Each of the ink tanks 8 also has an injection port 14 on the top surface thereof. The injection port 14 is an opening for injecting ink, and can be sealed (closed) by a tank cap 15. The tank cap 15 is formed of a member having rubber elasticity. By removing the tank cap 15 from the injection port 14 and inserting an ink bottle 23 (see FIG. 11), which is an ink refill bottle, into the injection port 14, the user can inject ink from the ink bottle 23 into the ink tank 8.

Figure 3A:
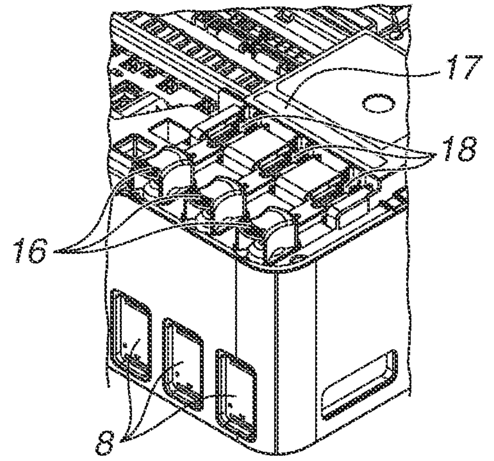
FIGS. 3A to 3C are perspective views each illustrating injection ports of the ink tanks and an area around the injection ports according to the first exemplary embodiment.
Figure 3B:
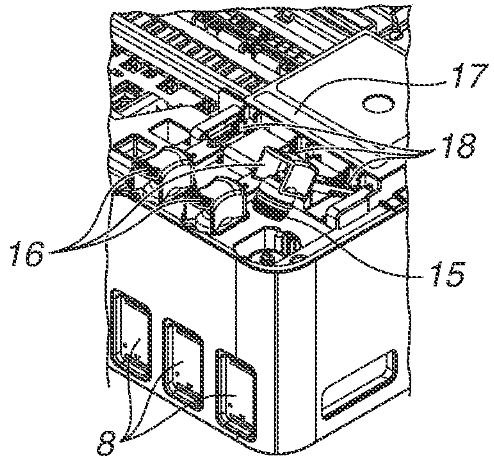
Figure 3C:
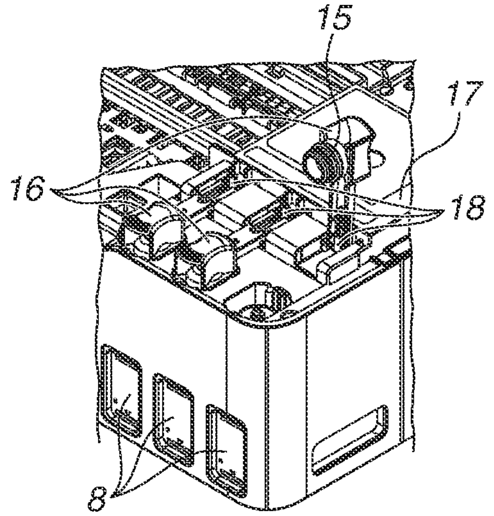

FIGS. 3A to 3C are perspective views each illustrating the injection ports 14 of the ink tanks 8 and the area around the injection ports 14. The tank caps 15 are attached to cap levers 16 operable by the user. The cap levers 16 are rotatably supported on a middle frame 17 fixed to a main body of the recording apparatus 50. During the recording operation by the recording head 4, the cap levers 16 are in a cap closed state where the tank caps 15 close the injection ports 14 as illustrated in FIG. 3A.

For ink injection, the user can operate the desired cap lever 16 to open the tank cap 15. At this time, the cap lever 16 is rotated to shift to a cap open state illustrated in FIG. 3B. When the user further continues to rotate the cap lever 16, the rotating cap lever 16 interferes with a holding portion 18 protruding upward from the middle frame 17. The interference with the holding portion 18 causes the cap lever 16 to elastically deform and ride onto the holding portion 18, so that the cap lever 16 shifts to a cap lever holding state (holding position) illustrated in FIG. 3C.

Figure 4A:
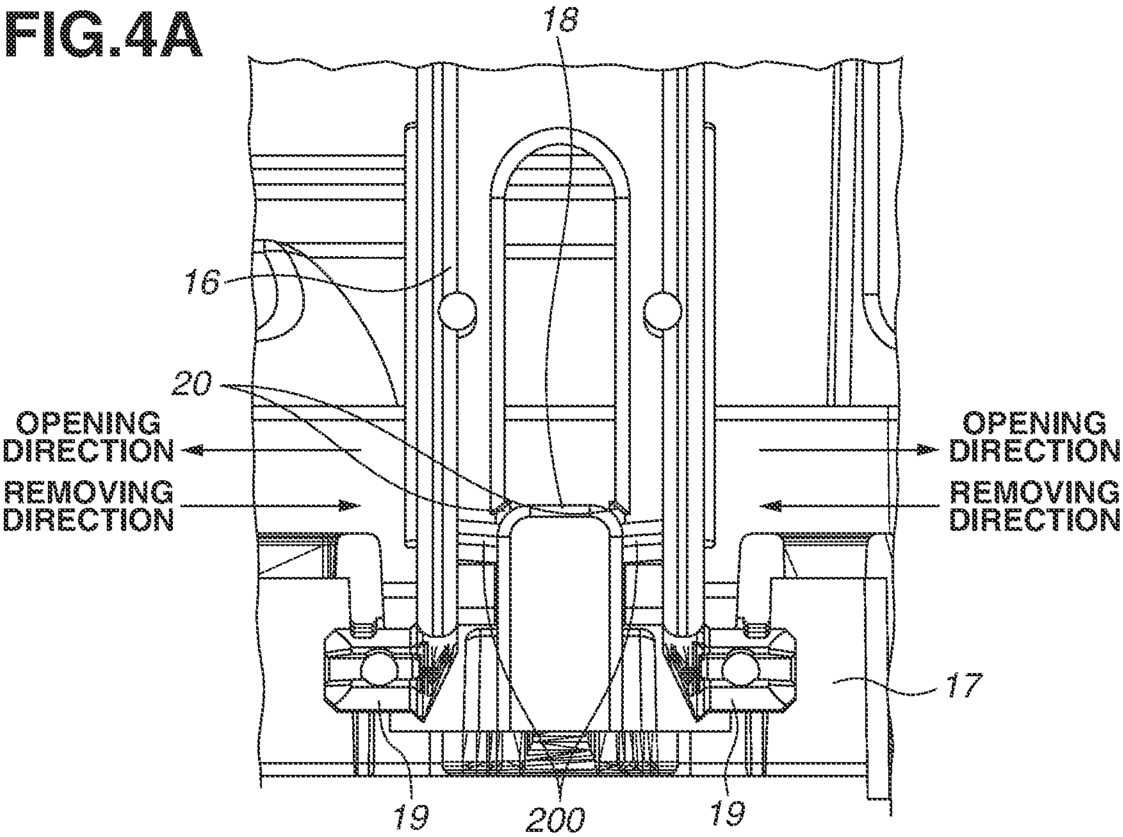
FIGS. 4A and 4B are views each illustrating a configuration in which a holding portion holds a cap lever according to the first exemplary embodiment.

A configuration in which the holding portion 18 holds the cap lever 16 will be described with reference to FIGS. 4A and 4B. FIG. 4A is an enlarged view illustrating the holding portion 18, the cap lever 16 in the cap lever holding state, and the area therearound as viewed from the front side of the recording apparatus 50.

The cap lever 16 includes lever rotation shafts 19 pivotally supported by the middle frame 17 so that the cap lever 16 can rotate about the lever rotation shafts 19. The cap lever 16 also has a hole with a predetermined length that is formed in a direction from the lever rotation shafts 19 toward the attachment portion to which the tank cap 15 is attached. In a case where the cap lever 16 shifts from the cap open state to the cap lever holding state, contact ribs 20 of the cap lever 16 come into contact with the holding portion 18, so that inner portions 200 surrounding the circumference of the hole become elastically deformed in an opening direction illustrated in FIG. 4A. At this time, since the contact ribs 20 as parts of the inner portions 200 also become elastically deformed, the contact ribs 20 of the cap lever 16, which is continuously rotated by the user, ride over the holding portion 18, so that the cap lever 16 becomes the cap lever holding state.

Figure 4B:
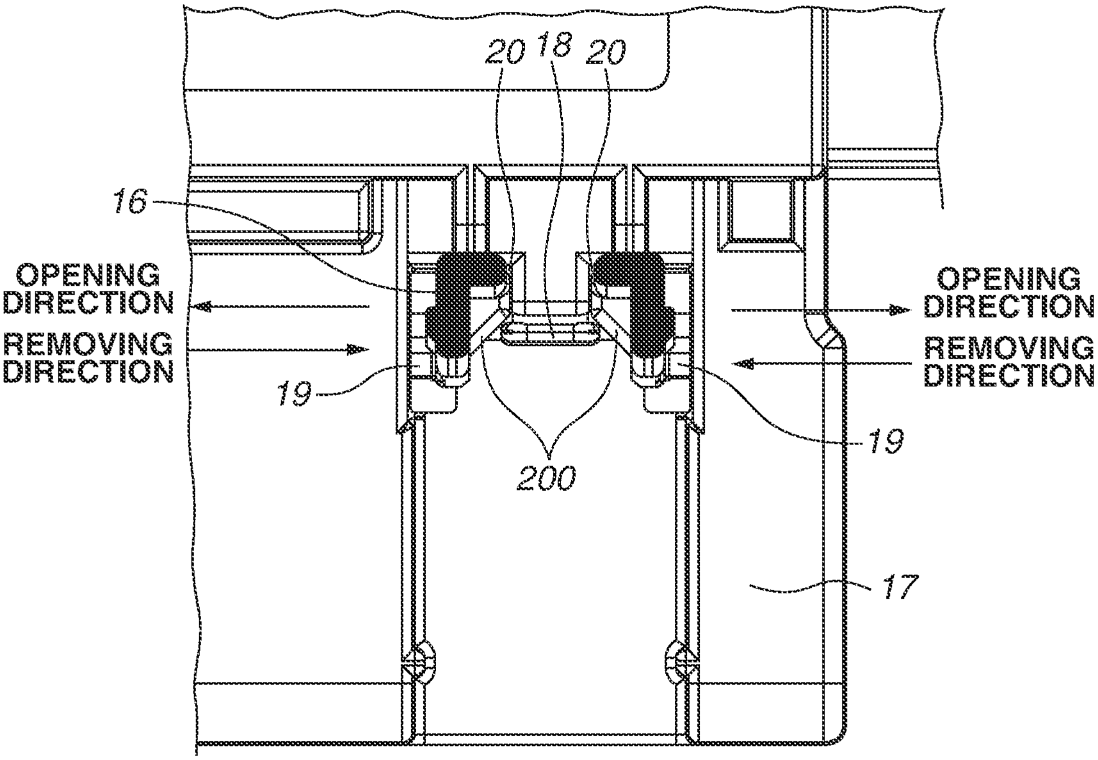

FIG. 4B is a schematic top view illustrating a positional relationship between the cap lever 16 in the cap lever holding state and the holding portion 18 as viewed from above. After the contact ribs 20 of the cap lever 16 ride over the holding portion 18, the inner portions 200 of the cap lever 16 and the holding portion 18 interfere with each other. Accordingly, the cap lever holding state is formed where, even if the user releases the hand from the cap lever 16, the cap lever 16 maintains a self-standing state. In the present exemplary embodiment, when the cap lever 16 shifts to the cap lever holding state, the user can feel a click through the cap lever 16. In addition, the contact ribs 20 make a sound when riding over the holding portion 18.

The opening direction of the inner portions 200 of the cap lever 16 is opposite to a removing direction in which the cap lever 16 is removed from the middle frame 17. More specifically, when the cap lever 16 is rotated by the user's operation, a force is applied to the cap lever 16 in the opening direction, and is not applied to the cap lever 16 in the removing direction opposite to the opening direction. The cap lever 16 is thus prevented from being removed by the rotation operation.

As the configuration for holding the cap lever 16, the configuration in which the cap lever 16 becomes elastically deformed and rides over the holding portion 18 has been described in the present exemplary embodiment. Alternatively, the cap lever 16 may be held by friction, for example.

Figure 11:
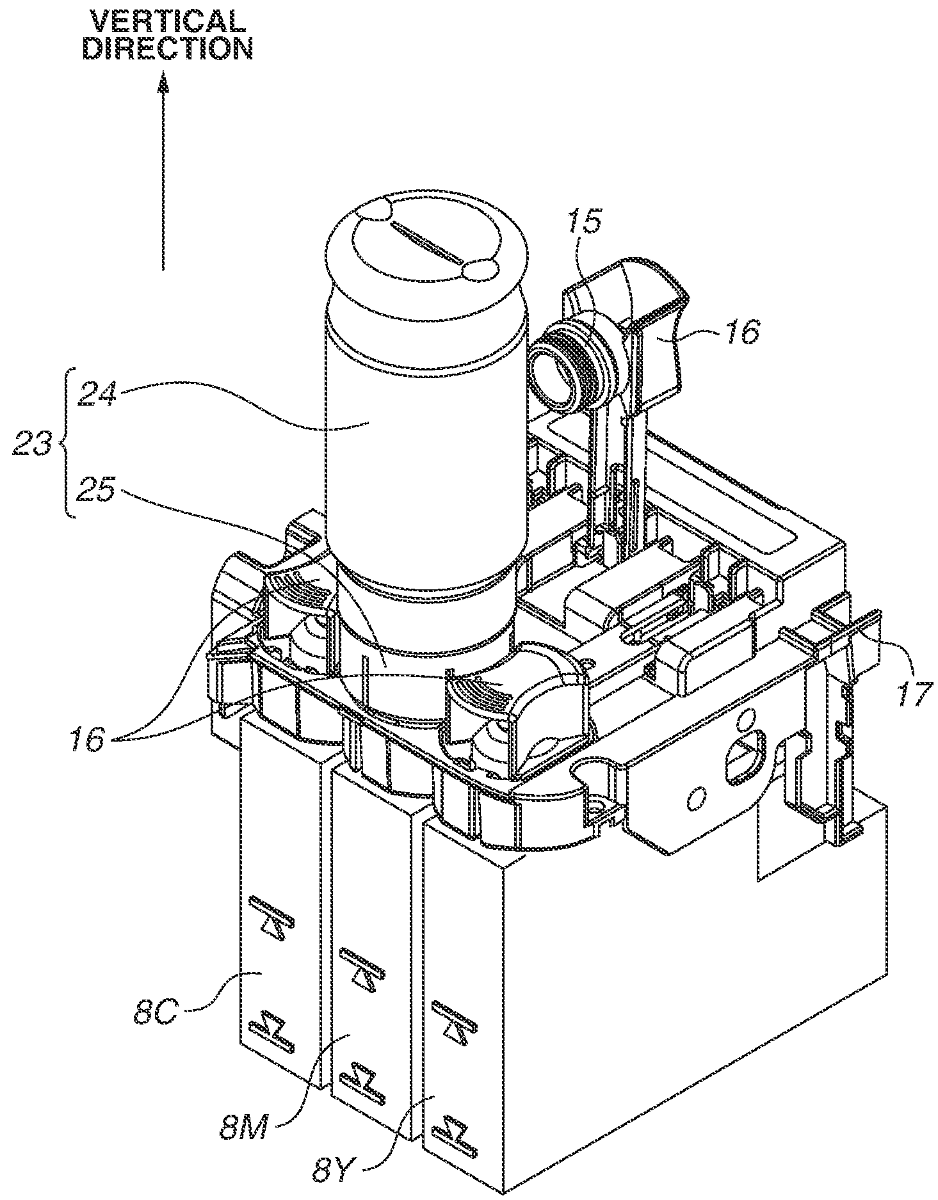
FIG. 11 is a perspective view illustrating a state where ink is being injected into one of the ink tanks according to the first exemplary embodiment.

FIG. 11 is a perspective view illustrating an operation of injecting ink into the color ink tank (the magenta ink tank 8M) on the right side as viewed from the front side of the recording apparatus 50. FIG. 11 illustrates a state where the ink is being injected from the ink bottle 23 into the magenta ink tank 8M.

The ink bottle 23 is formed of an ink containing portion 24 containing the ink, and an ink outlet portion 25 provided with an outlet through which the ink is injected to the injection port 14. The ink bottle 23 according to the present exemplary embodiment is columnar and has a curved side surface. The cap lever 16 is disposed so as not to interfere with the ink bottle 23 from which the ink is being injected, while the cap lever 16 is in the cap lever holding state where the cap lever 16 is held by the holding portion 18.

Figure 12:
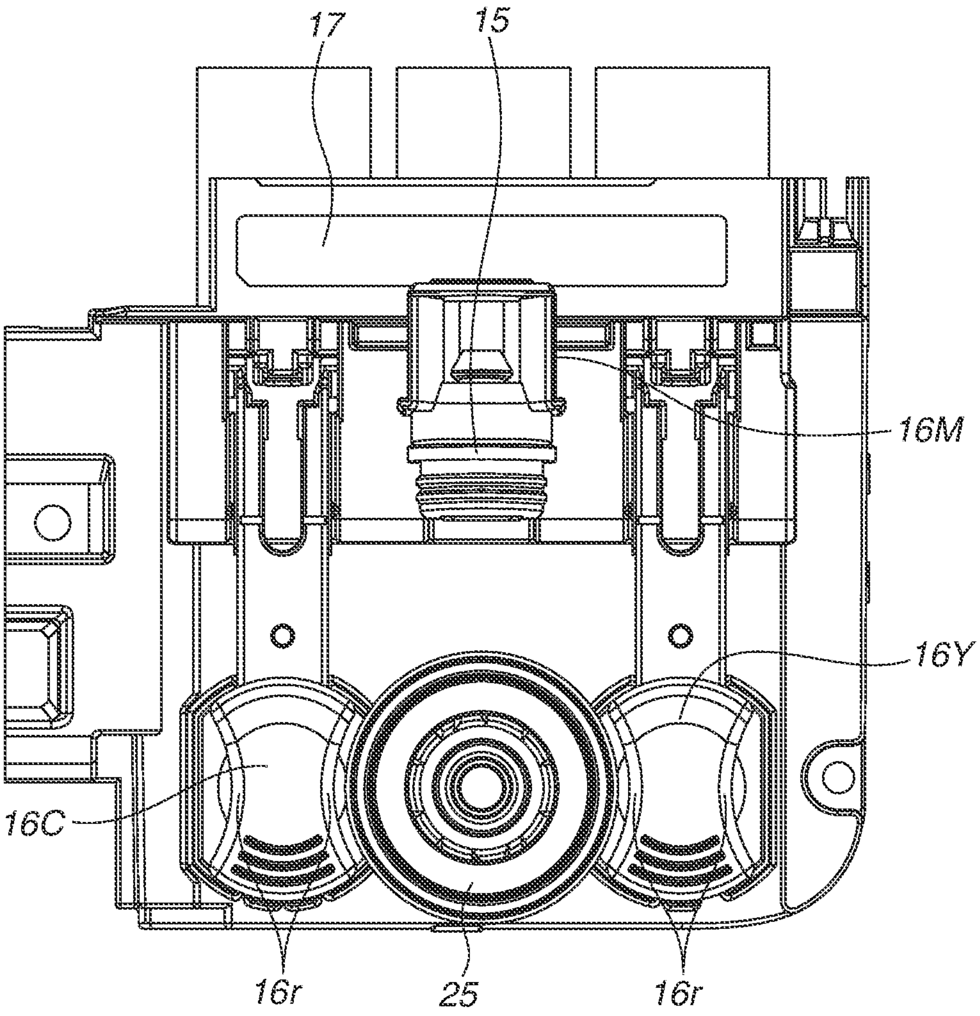
FIG. 12 is a schematic top view illustrating the state where the ink is being injected into one of the ink tanks according to the first exemplary embodiment.

FIG. 12 is a schematic top view illustrating a positional relationship between the cap lever 16 and the ink outlet portion 25, where the ink injection operation illustrated in FIG. 11 is viewed from the vertical direction (from above). Each of the cap levers 16 has concave portions 16*r* that appear to be recessed when viewed from above, on an outer surface of a holding portion that holds the tank cap 15. The concave portions 16*r* are curved along the side surface of the ink bottle 23 so as to prevent contact with the curved side surface of the ink bottle 23 as illustrated in FIG. 12.

By providing the concave portions 16*r* in the cap levers 16, the magenta ink, for example, can be injected into the magenta ink tank 8M while the cap levers 16C and 16Y other than the cap lever 16M of the magenta ink tank 8M are kept in the cap closed state. The ink bottle 23 according to the present exemplary embodiment is formed of the ink containing portion 24 and the ink outlet portion 25, but is not limited thereto. Alternatively, the ink containing portion 24 and the ink outlet portion 25 may be integrated.

Figure 5A:
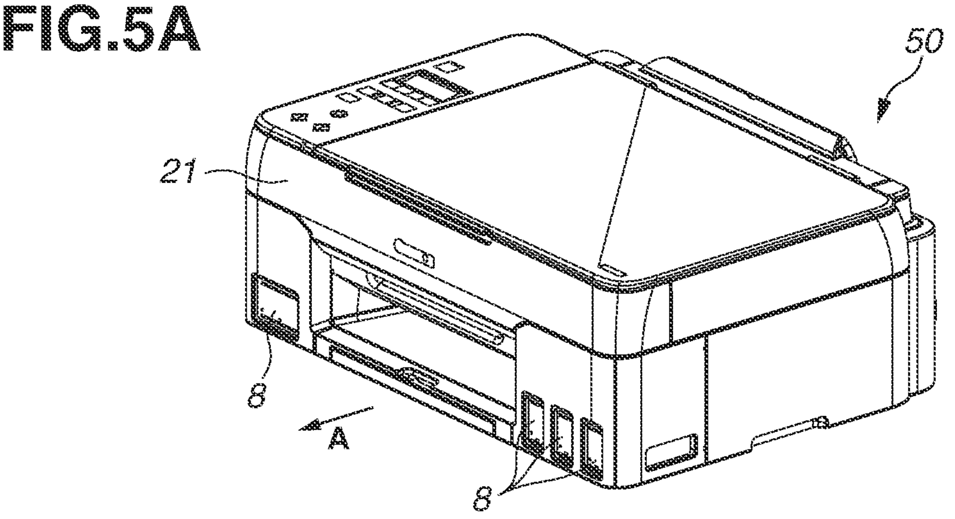
FIGS. 5A to 5C are schematic views each illustrating an outer appearance of the ink jet recording apparatus according to the first exemplary embodiment.
Figure 5B:
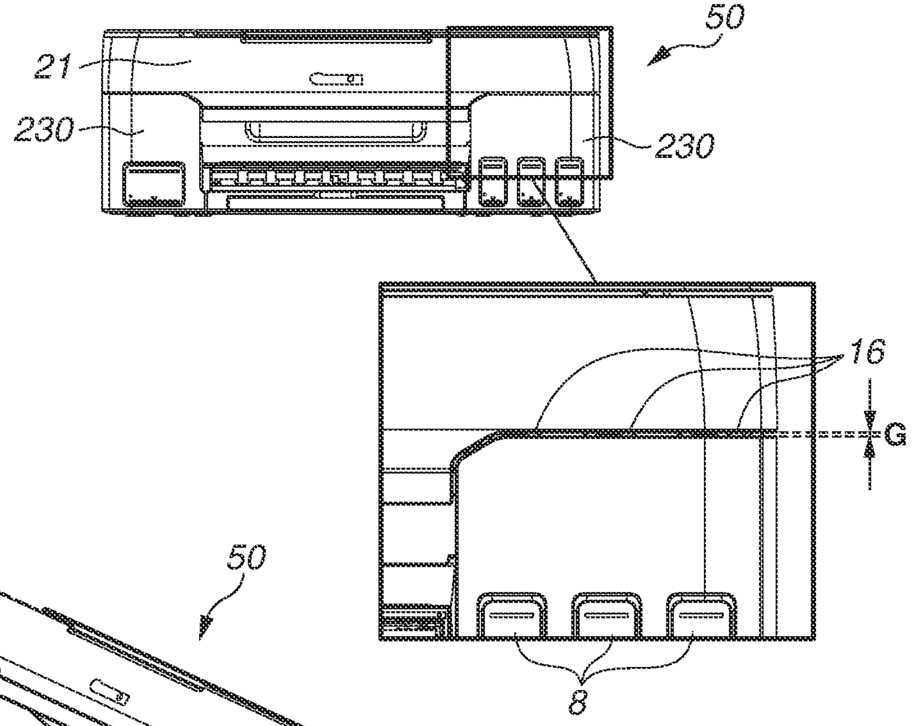
Figure 5C:
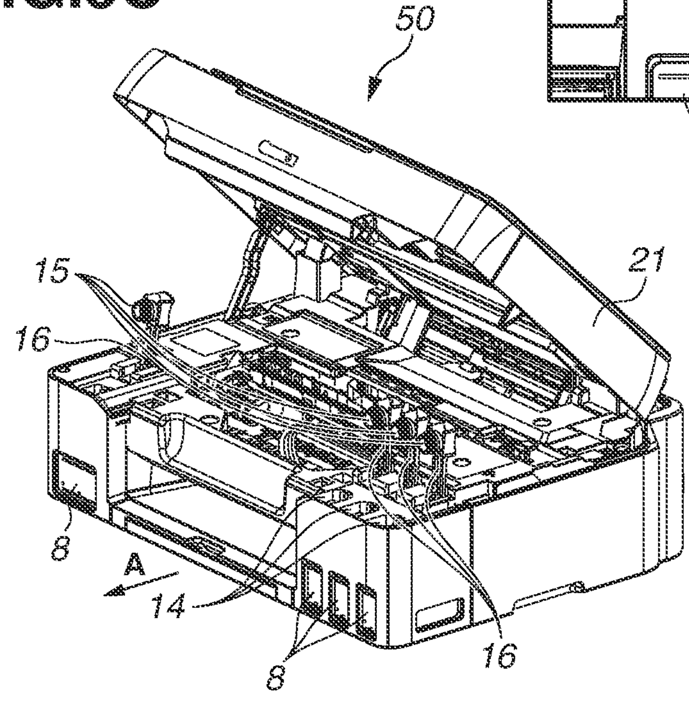

FIGS. 5A to 5C are schematic diagrams each illustrating an outer appearance of the recording apparatus 50. As illustrated in FIG. 5A, the recording apparatus 50 has the scanner unit 21 as a reading unit capable of reading an image of an original document placed thereon. The scanner unit 21 is openable and closable with respect to the housing of the recording apparatus 50. FIG. 5A illustrates a state where the scanner unit 21 is closed (in a closed position).

When the scanner unit 21 is opened by the user's operation, the conveyance roller 1, the recording head 4, the injection ports 14, and the cap levers 16 are exposed. When the scanner unit 21 is closed by the user's operation, the conveyance roller 1, the recording head 4, the injection ports 14, and the cap levers 16 are covered with the scanner unit 21. More specifically, by opening the scanner unit 21, the user can access the conveyance path of the recording medium to perform an operation such as removing a jammed sheet of the recording medium from the conveyance path.

A rotation shaft serving as a rotation center of the scanner unit 21 is provided upstream of the conveyance roller 1 in the direction indicated by an arrow A in FIG. 5A (the conveyance direction). While the scanner unit 21 is closed, the cap levers 16 are covered with the scanner unit 21, thereby preventing the user from operating the cap levers 16.

FIG. 5B is a front view of the recording apparatus 50 and an enlarged partial view of the front side of the recording apparatus 50. While the scanner unit 21 is closed, a gap G is provided as an opening portion between the scanner unit 21 and an outer cover 230 of the housing. Thus, even with the scanner unit 21 closed, the user can see the cap levers 16 through the gap G. Each of the cap levers 16 is color-coded in a color corresponding to the color of the ink contained in the ink tank 8, so that the user can recognize the position of the ink to be injected, without opening the scanner unit 21.

For ink injection, the user first opens the scanner unit 21 and then opens the tank cap 15 (the cap lever 16) corresponding to the color of the ink to be injected, thereby bringing about a state illustrated in FIG. 5C. The position of the opened scanner unit 21 illustrated in FIG. 5C is referred to as an open position. While the scanner unit 21 is in the open position, the recording apparatus 50 detects, using a sensor (not illustrated), that the scanner unit 21 is open, and thus interrupts or disables the execution of the recording operation and the like. Upon completion of the injection of the ink from the ink bottle 23 (see FIG. 11), the user closes the tank cap 15 (the cap lever 16) and then closes the scanner unit 21, whereby the use of the recording apparatus 50 (the recording operation) is enabled.

Figure 6:
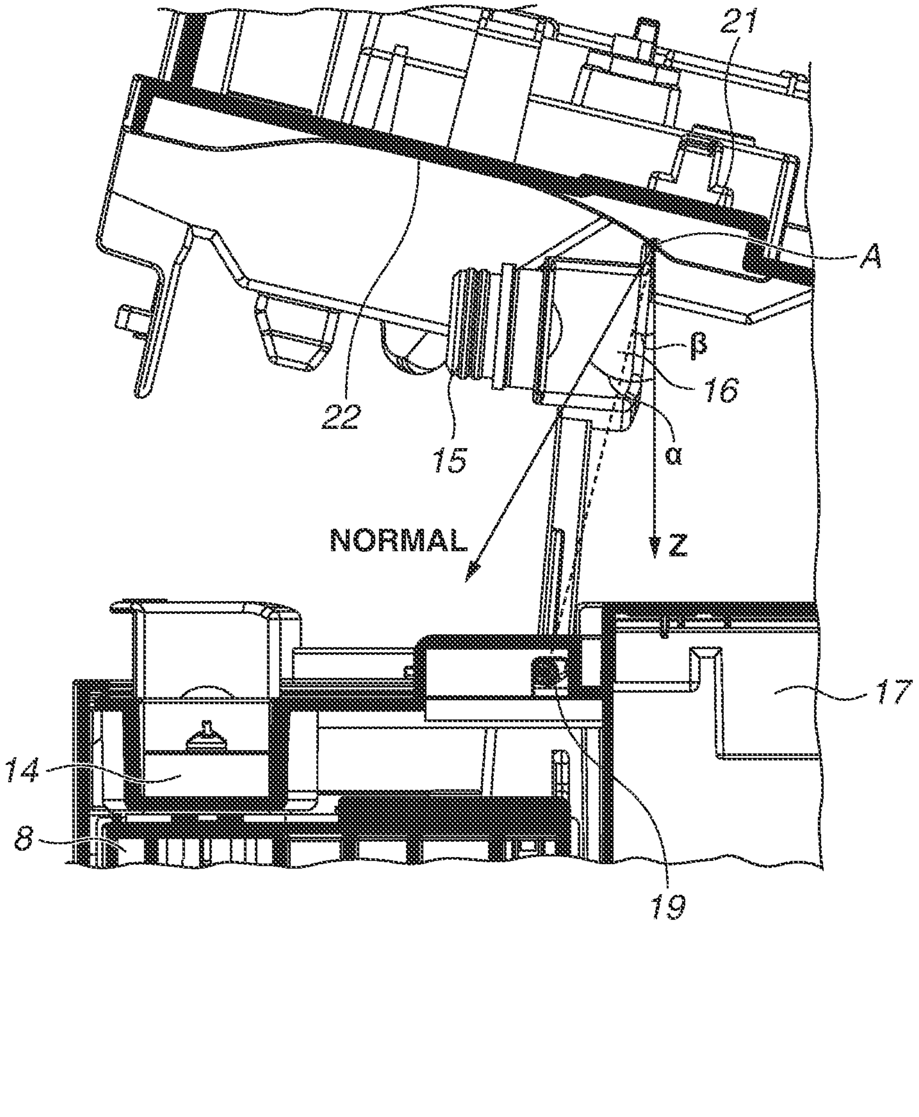
FIG. 6 is a transverse cross-sectional view illustrating a case where a scanner unit is to be closed in a state where any of the injection ports is not closed by a tank cap according to the first exemplary embodiment.

FIG. 6 is a transverse cross-sectional view illustrating a case where the user performs an operation of closing the scanner unit 21 without closing the tank cap 15 (the cap lever 16). The scanner unit 21 has an at least partially curved sliding surface (or sliding portion) 22 that is provided on a surface facing the cap lever 16 and is capable of contact with the cap lever 16. If the user performs the operation of closing the scanner unit 21 while the cap lever 16 is still in the cap lever holding state, the curved surface portion of the sliding surface 22 and the cap lever 16 come into contact (abutment) with each other at a contact point A while the scanner unit 21 is moving to the closed position.

The angle of the curved surface of the sliding surface 22 will be described now. At the curved surface portion of the slide surface 22, the angle between a gravity direction Z and a normal at the contact point A with the cap lever 16 in the cap lever holding state is defined as an angle $\alpha$. In addition, the angle between the gravity direction Z and a straight line connecting the contact point A and the lever rotation shaft 19 is defined as an angle $\beta$. In this case, the sliding surface 22 is formed so as to satisfy the relation of the angle $\alpha$>the angle $\beta$.

More specifically, the angle of the curved surface is set in such a manner that a force is applied to the cap lever 16 in a closing direction of the cap lever 16 by the weight of the scanner unit 21 via the contact point A between the scanner unit 21 and the cap lever 16. In other words, when the cap lever 16 comes into contact with the curved surface portion of the sliding surface 22, the cap lever 16 is urged toward the position at which the tank cap 15 closes the injection port 14. Accordingly, even if the user forgets to close the tank cap 15, the operation of closing the scanner unit 21 enables the cap lever 16 to be released from the cap lever holding state and be shifted to the cap closed state.

Figure 7:
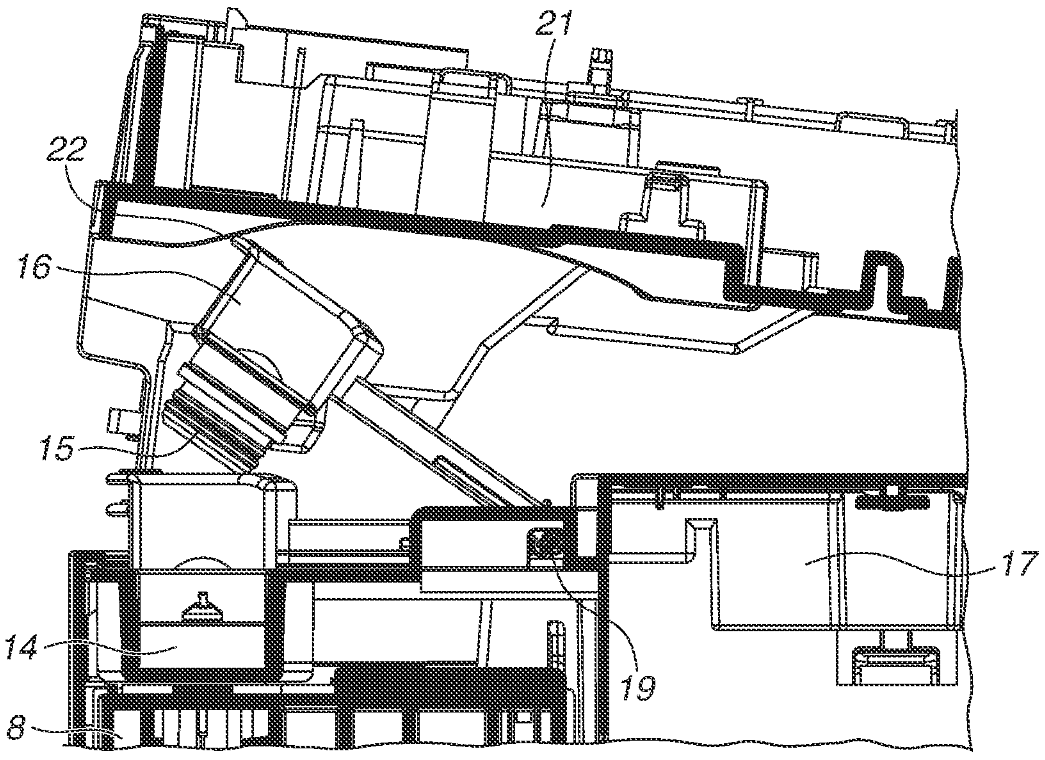
FIG. 7 is a transverse cross-sectional view illustrating a state where a user is closing the scanner unit according to the first exemplary embodiment.

FIG. 7 is a transverse cross-sectional view illustrating a state where the user is closing the scanner unit 21 in the state illustrated in FIG. 6. The sliding surface 22 according to the present exemplary embodiment has the curved surface extending up to the vicinity of the front side of the recording apparatus 50. Accordingly, the cap lever 16 shifting to the cap closed state can be continuously guided by the sliding surface 22.

With the above-described configuration, even if the user forgets to close the tank cap 15, the operation of closing the scanner unit 21 causes the tank cap 15 to close the injection port 14. Therefore, it is possible to reduce the risk of ink evaporation or ink leakage from the ink tank 8 due to the user forgetting to close the tank cap 15.

Figure 8:
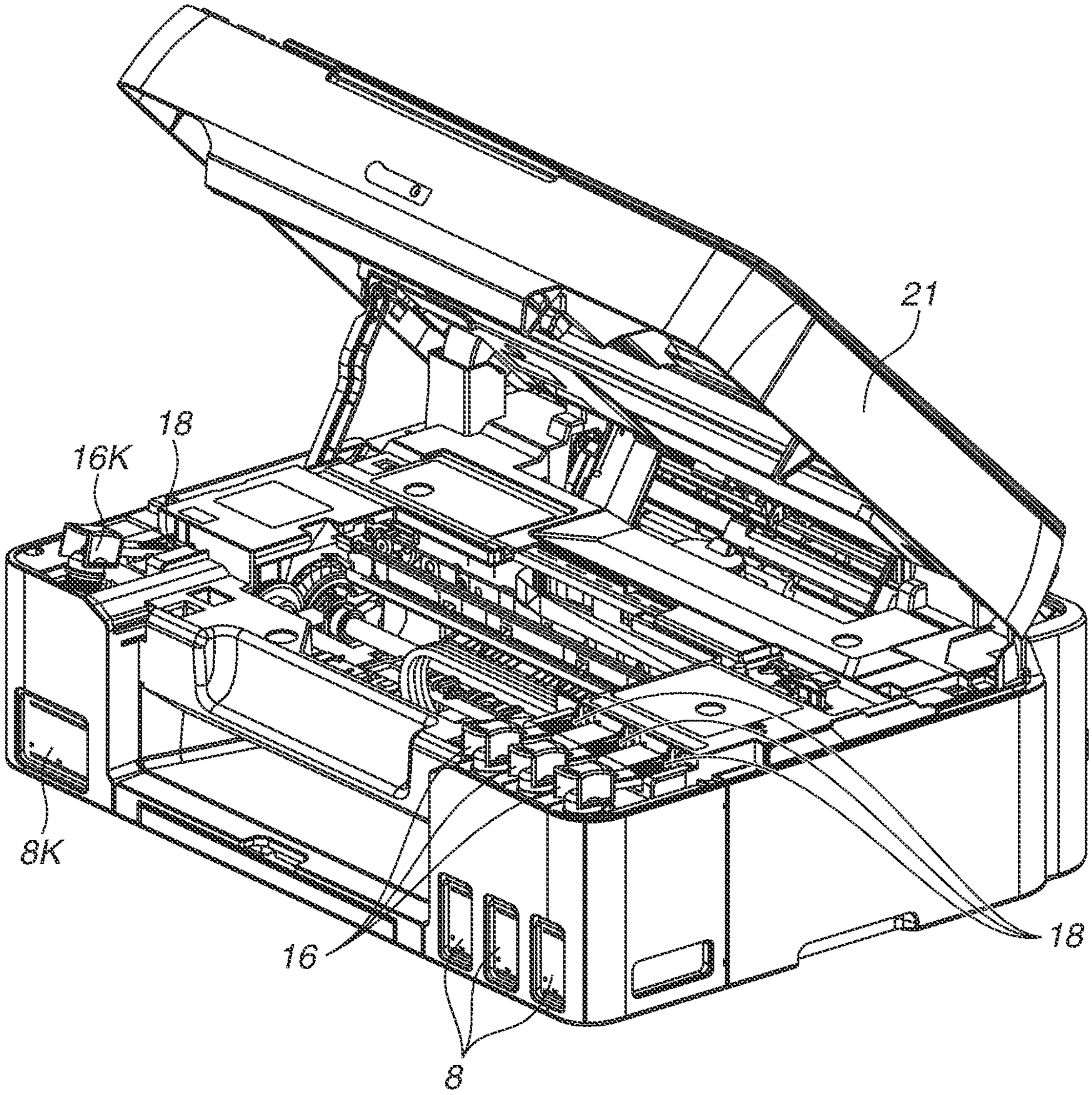
FIG. 8 is a perspective outer appearance view illustrating a state where the injection port for black ink is not closed by the tank cap according to the first exemplary embodiment.

FIG. 8 is a perspective outer appearance view illustrating a state where, although the black cap lever 16K falls down under the own weight thereof, the injection port 14 of the black ink tank 8K is not closed by the tank cap 15. In FIG. 8, the scanner unit 21 is in the open position. In the state illustrated in FIG. 8, the black cap lever 16K is not held by the holding portion 18 and falls down under gravity. The injection port 14 is thus not closed by the tank cap 15.

Figure 9:
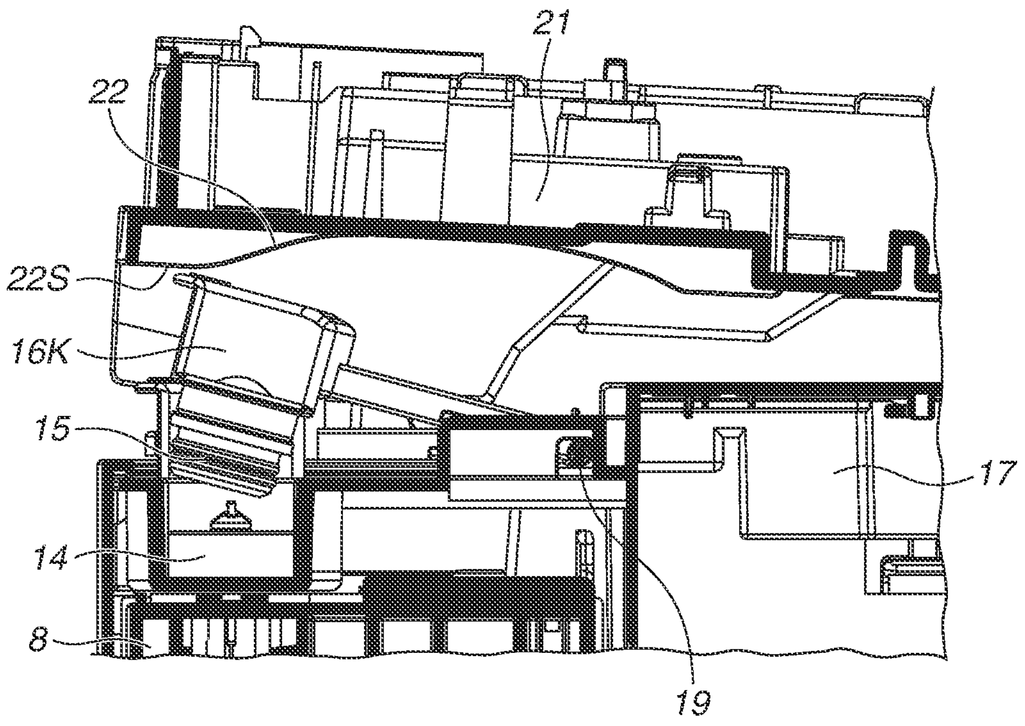
FIG. 9 is another transverse cross-sectional view illustrating the state where the user is closing the scanner unit according to the first exemplary embodiment.

FIG. 9 is a transverse cross-sectional view illustrating a state where the user is closing the scanner unit 21 in the state illustrated in FIG. 8. The sliding surface 22 according to the present exemplary embodiment has a horizontal portion 22S closer to the front side of the recording apparatus 50 than the curved surface portion. The operation of closing the scanner unit 21 causes the black cap lever 16K falling down under gravity to come into contact with the horizontal portion 22S, thereby closing the injection port 14. More specifically, the cap lever 16 is forced by the weight of the scanner unit 21 to press the tank cap 15 in a downward direction (a direction for closing the injection port 14) from the horizontal portion 22S coming into contact with the cap lever 16. Thus, if the user has closed the scanner unit 21 while the injection port 14 is not closed by the tank cap 15, the operation of closing the scanner unit 21 causes the sliding surface 22 (the horizontal portion 22S) to come into contact with the cap lever 16, thereby closing the injection port 14.

The sliding surface 22 is provided at the position facing the black cap lever 16K and at the position facing the color cap levers 16. The sliding surface 22 facing the color cap levers 16 is provided across the area that can face all the three cap levers 16. The provision of the common sliding surface 22 for the plurality of cap levers 16 can make the configuration of the recording apparatus 50 more simply. If the number of the ink tanks 8 (i.e., the number of the cap levers 16 facing the sliding surface 22) is increased or decreased, it is possible to achieve the above-described configuration by changing the length of the sliding surface 22 in the main scanning direction.

Figure 10:
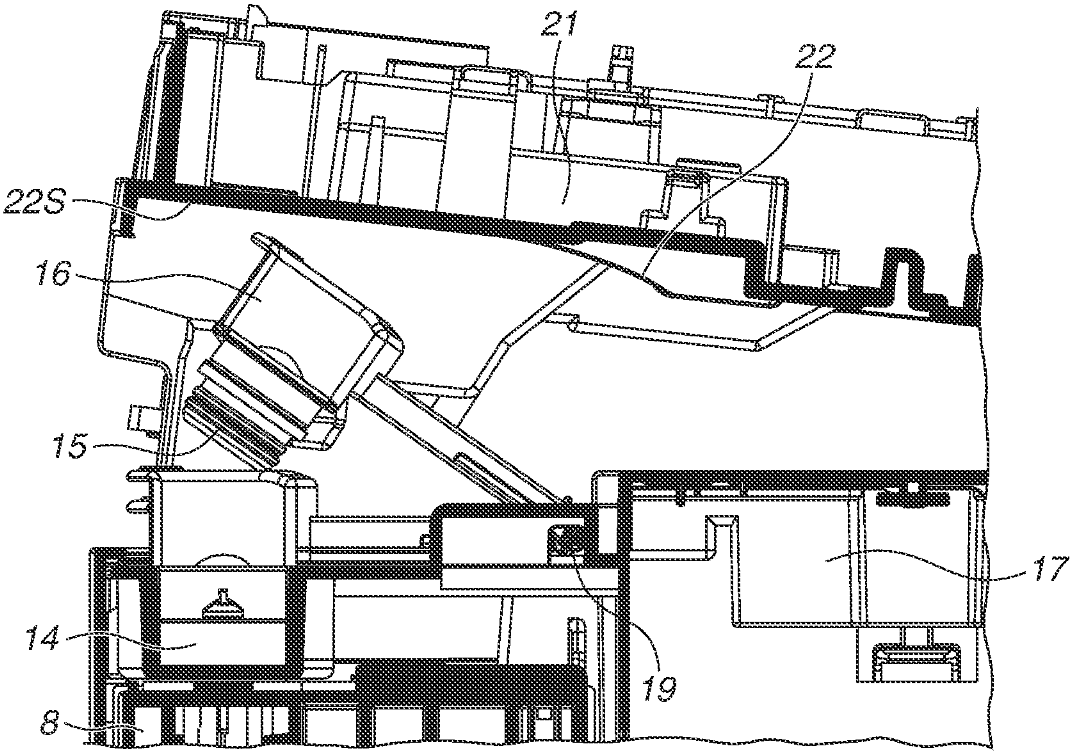
FIG. 10 is a transverse cross-sectional view illustrating a modification example of a sliding surface of the scanner unit.

FIG. 10 is a transverse cross-sectional view illustrating a modification example of the sliding surface 22. In the first exemplary embodiment, the example has been described in which the sliding surface 22 has the curved surface extending up to the vicinity of the front side of the recording apparatus 50. In the example of FIG. 10, the sliding surface 22 has the horizontal portion 22S on the front side of the recording apparatus 50. As illustrated in FIG. 10, configuring the sliding surface 22 to have the curved surface at least in the area facing the cap lever 16 in the cap lever holding state produces a similar advantageous effect of preventing the tank cap 15 from being forgotten to be closed.

While the scanner unit 21 has been described as the example of the cover that is openable and closable with respect to the housing of the recording apparatus 50, a cover without a reading unit may be adopted. In this case, the weight of the cover and the distance from the rotation shaft of the cover to the sliding surface 22 are appropriately adjusted, so that the injection ports 14 can be closed by the tank caps 15 under the weight of the cover.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

a first tank configured to contain liquid to be supplied to a printhead, the first tank including a first injection port through which the liquid is injected;

a second tank configured to contain liquid to be supplied to the printhead, the second tank including a second injection port through which the liquid is injected;

a first holder configured to hold a first cap for capping the first injection port; and a second holder configured to hold a second cap for capping the second injection port, wherein the second tank is provided adjacent to the first tank, wherein the first holder has an opening through which the first cap is exposed from a front side of the printing apparatus, and wherein the first holder includes a concave portion on a surface facing the second holder.

2. The printing apparatus according to claim 1, wherein the concave portion faces a side surface of a bottle for injecting the liquid into the second tank through the second injection port, in a state where the first cap caps the first injection port and the second cap does not cap the second injection port.

3. The printing apparatus according to claim 2, wherein the concave portion does not contact with the side surface of the bottle in a state where the first cap caps the first injection port and the second cap does not cap the second injection port.

4. The printing apparatus according to claim 2, wherein the concave portion is curved along the side surface of the bottle.

5. The printing apparatus according to claim 1, further comprising a holding portion configured to hold the first holder at a position where the first cap does not cap the first injection port.

6. The printing apparatus according to claim 5, wherein the holding portion causes the first holder to elastically deform and ride onto the holding portion to hold the first holder at the position.

7. The printing apparatus according to claim 1, the first holder is movable between a first position where the first cap caps the first injection port and a second position where the first cap does not cap the first injection port.

8. The printing apparatus according to claim 7, wherein the first holder is rotatable between the first position and the second position.

9. The printing apparatus according to claim 1, further comprising a conveyance roller configured to convey a print medium in a conveyance direction, wherein the first tank and the second tank are arrayed in a direction crossing the conveyance direction.

10. The printing apparatus according to claim 1, further comprising a conveyance roller configured to convey a print medium in a conveyance direction, wherein the first tank and the second tank are provided downstream of the conveyance roller in the conveyance direction.

11. The printing apparatus according to claim 1, wherein the first holder is color-coded in a color corresponding to a color of the liquid in the first tank.

12. The printing apparatus according to claim 1, wherein the first tank includes a first chamber containing the liquid and a second chamber containing air.

13. The printing apparatus according to claim 1, further comprising a tube configured to connect the first tank and the printhead.

14. The printing apparatus according to claim 1, further comprising the print head.

15. The printing apparatus according to claim 1, further comprising a carriage configured to carry the print head in a scanning direction.

16. A printing apparatus comprising:

a first tank configured to contain liquid to be supplied to a printhead, the first tank including a first injection port through which the liquid is injected;

a second tank configured to contain liquid to be supplied to the printhead, the second tank including a second injection port through which the liquid is injected;

a first holder configured to hold a first cap for capping the first injection port;

a second holder configured to hold a second cap for capping the second injection port, and a holding portion configured to hold the first holder at a position where the first cap does not cap the first injection port, wherein the second tank is provided adjacent to the first tank, wherein the first holder includes a concave portion on a surface facing the second holder, and wherein the holding portion causes the first holder to elastically deform and ride onto the holding portion to hold the first holder at the position.

* * * * *